(12) United States Patent
Hornischer

(10) Patent No.: US 10,439,470 B2
(45) Date of Patent: Oct. 8, 2019

(54) FRICTION-OPTIMIZED ELECTRIC DRIVE SYSTEM

(71) Applicant: AUDI AG, Ingolstadt (DE)

(72) Inventor: Jörg Hornischer, Wettstetten (DE)

(73) Assignee: AUDI AG, Ingolstadt (DE)

( * ) Notice: Subject to any disclaimer, the term of this patent is extended or adjusted under 35 U.S.C. 154(b) by 209 days.

(21) Appl. No.: 15/816,551

(22) Filed: Nov. 17, 2017

(65) Prior Publication Data

US 2018/0145557 A1 May 24, 2018

(30) Foreign Application Priority Data

Nov. 21, 2016 (DE) .................. 10 2016 222 844

(51) Int. Cl.
| | |
|---|---|
| *H02K 7/06* | (2006.01) |
| *H02K 7/00* | (2006.01) |
| *H02K 7/116* | (2006.01) |
| *H02K 7/08* | (2006.01) |
| *B60K 7/00* | (2006.01) |
| *H02K 16/00* | (2006.01) |
| *B60K 17/04* | (2006.01) |

(52) U.S. Cl.
CPC .............. *H02K 7/003* (2013.01); *B60K 7/00* (2013.01); *B60K 7/0007* (2013.01); *B60K 17/046* (2013.01); *H02K 7/006* (2013.01); *H02K 7/08* (2013.01); *H02K 7/083* (2013.01); *H02K 7/116* (2013.01); *H02K 16/00* (2013.01); *B60K 2007/0046* (2013.01); *B60K 2007/0092* (2013.01); *B60Y 2410/102* (2013.01)

(58) Field of Classification Search
CPC .... H02K 5/1732; H02K 7/116; H02K 5/1672; H02K 7/083; H02K 5/16; H02K 5/163; H02K 5/1735
USPC ............................................. 310/83, 90, 114
See application file for complete search history.

(56) References Cited

U.S. PATENT DOCUMENTS

| | | | | |
|---|---|---|---|---|
| 1,858,506 A | * | 5/1932 | Jacobs ..................... | B60K 1/02 180/65.6 |
| 2,864,016 A | | 12/1958 | Waltscheff | |
| 5,419,406 A | * | 5/1995 | Kawamoto .............. | B60K 1/02 180/65.6 |
| 2009/0295242 A1 | * | 12/2009 | Yamamoto ............. | B60K 6/445 310/83 |
| 2014/0014425 A1 | * | 1/2014 | Yamanaka ........... | B60G 21/051 180/65.51 |
| 2014/0128192 A1 | * | 5/2014 | Korenaga ................ | F16H 1/32 475/5 |

(Continued)

FOREIGN PATENT DOCUMENTS

| | | |
|---|---|---|
| DE | 4236124 A1 | 5/1993 |
| DE | 3725620 C2 | 6/1995 |
| DE | 102009033531 A1 | 1/2011 |

(Continued)

OTHER PUBLICATIONS

German Search Report dated Jul. 24, 2017 of corresponding German application No. 102016222844.7; 7 pgs.

*Primary Examiner* — Thanh Lam
(74) *Attorney, Agent, or Firm* — Maier & Maier, PLLC

(57) ABSTRACT

A drive system for a motor vehicle with two electric machines, which is provided with a special bearing arrangement of the rotors of the electric machines. The motor vehicle is equipped with such a drive system.

14 Claims, 1 Drawing Sheet

(56) References Cited

U.S. PATENT DOCUMENTS

2018/0015815 A1\* 1/2018 Makino .................. B60L 15/20

FOREIGN PATENT DOCUMENTS

| GB | 1022634 A | 3/1966 |
| JP | H7-147704 A | 6/1995 |

\* cited by examiner

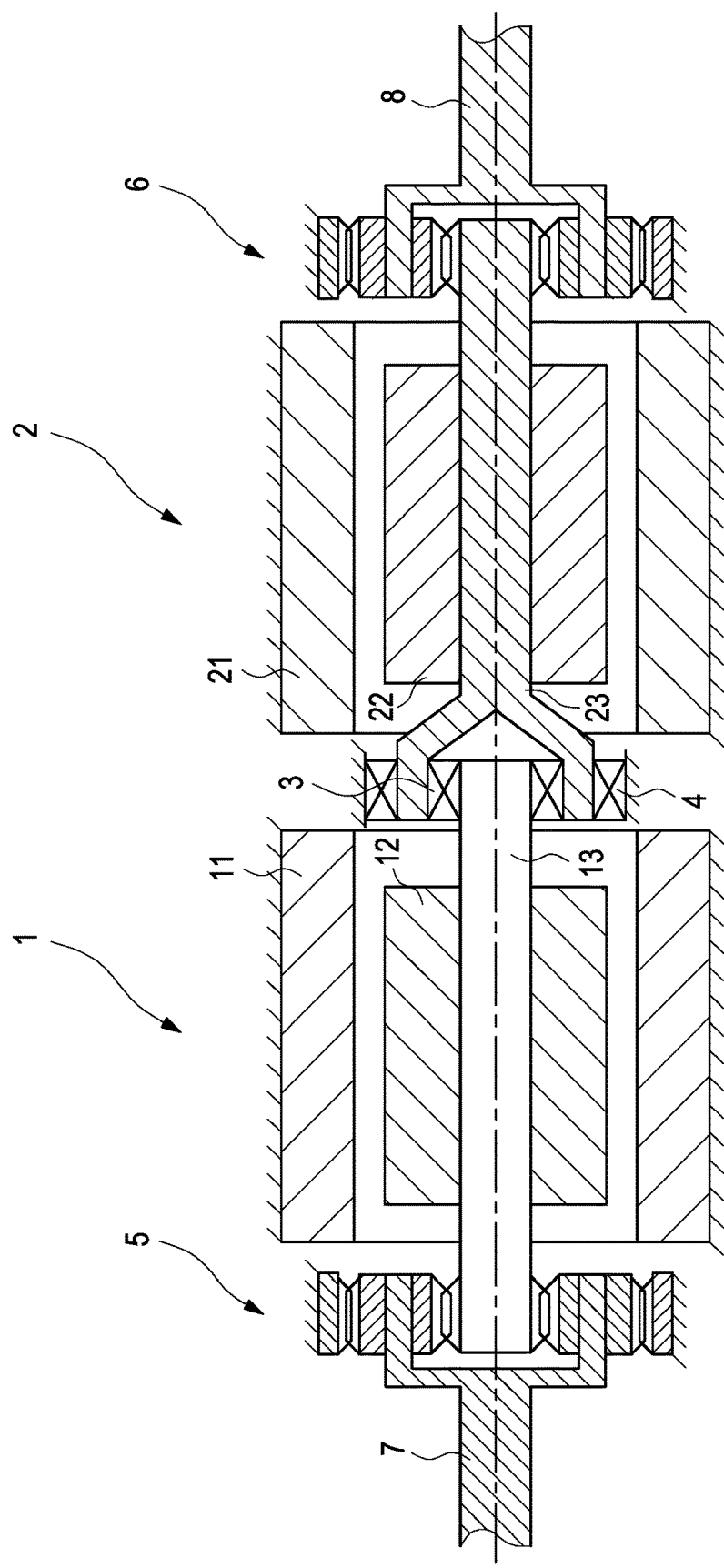

FRICTION-OPTIMIZED ELECTRIC DRIVE SYSTEM

FIELD

The invention relates to an electric drive system for a motor vehicle, which is provided with two electric machines and which has a special bearing for the rotors of the electric machine. The invention further relates to a motor vehicle that is equipped with such drive system.

BACKGROUND

The rotors of electric machines are usually mounted with two roller bearings, so that each is mounted at the end of a shaft end. In most cases, one more gear is arranged between the E-machine and the joint gear. With an electric axle drive that has two E-machines, friction losses are thus always generated in all four bearings.

DE 42 36 124 A1 discloses an electric vehicle having a drive unit that is provided with two electric engines arranged on one axle, which are respectively connected by means of a planetary gear to a drive wheel. The drive shafts of both electric engines are connected to each other via a differential device. Both drive shafts are respectively mounted with two roller bearings.

DE 37 25 620 C2 describes a drive and brake apparatus with recovery of braking energy for motor vehicle, in particular for four-wheel drive motor vehicles, wherein each driven vehicle wheel is provided with an electric engine that also works as a generator. The driven vehicle wheels are preferably connected by means of a planetary gear to a support brake. Both electric engines are arranged on one axle in a joint housing, which is elastically mounted on the car body. The housing of the support brakes is mounted on a roller bearing of the engine housing.

From DE 10 2009 033 531 A1 is known a drive device for a motor vehicle, wherein a hollow portal axle accommodates two electric machines which are assigned to a respective wheel of the vehicle. Between the electric machine and the vehicle wheel associated with it is arranged a reduction gear which is linked via a joint shaft to the associated vehicle wheel. The bearing of the rotors of both electric machines is not described in more details.

SUMMARY

The object is therefore to provide a drive system with two E-machines for a motor vehicle in which the occurring friction losses are reduced.

The object is achieved by a drive system for a motor vehicle. Embodiments are described in the description and in the attached FIGURES. In addition, the invention relates to a motor vehicle which is provided with the drive system according to the invention.

The drive system according to the invention comprises two electric machines which are respectively configured to apply a torque to an axle or to a wheel of the motor vehicle. The shafts of the rotors of both electric machines are arranged to be in alignment with each other. The ends of the shafts of the rotors of the two electric machines, which are located between the two electric machines, overlap coaxially. For this purpose, at least one end of a shaft or of a rotor shaft is designed as a hollow shaft and it is provided with an inner diameter which is larger than the outer diameter of the corresponding end of the other shaft or rotor shaft. The hollow end of one shaft receives the end of the other shaft and a bearing is arranged radially between both ends.

In the context of the present disclosure, the terms "shaft", "rotor shaft" or "the shaft of the rotor" are used as synonyms.

In one embodiment, the outer diameter of the shaft is increased towards the hollow end. A larger inner diameter of the hollow end of the shaft can thus be realized in this manner. In an embodiment, the outer diameter of the other shaft is constant over its length.

In another embodiment, the outer diameter of the shaft without hollow end is reduced so that it will be received by the hollow end of the other shaft. In one embodiment, the outer diameter of the other shaft is constant over its length.

In another embodiment, the outer diameter of the shaft with the hollow end is increased towards the hollow end and the outer diameter of the other shaft is reduced toward its end so that it will be received by the hollow end.

The changes in the outer diameter of the rotor shaft may be continuous or, or they may be carried out in sections.

In one embodiment, the bearing that is located between both coaxially overlapping ends of the rotor shafts is a roller bearing, in another embodiment, the bearing that is located between both coaxially overlapping ends of the rotor shaft is a sliding bearing.

The radially outer end of both coaxially overlapping ends of the rotor shafts is in one embodiment mounted in a rolling bearing.

Both coaxially overlapping ends of the rotor shaft are mounted in one embodiment of the drive system via two radially interconnected bearings. In this case, these bearings can be two radially connected roller bearings, or it can be a combination of an inner slide bearing with an outer roller bearing.

When both electric machines rotate at the same rotational speed, for example when the vehicle starts driving straight ahead, a relative movement and also friction occurs only in the radially outer bearing. A relative movement and thus also friction occurs in the radially inner bearing only with different rotational speeds of both E-machines, for example when the vehicle is driven through a curve, or with torque distribution (electric torque vectoring).

The opposite ends of the rotor shafts of both electric machine are in one embodiment respectively fixed radially in a planetary gear. Many variants are in this case possible. In one embodiment, each end of the rotor shaft is fixed in the sun wheel of the planetary gear. In another embodiment, each end of the rotor shaft is fixed in a planetary carrier of the planetary gear. By means of the fixing in a planetary gear, the roller bearings of the corresponding shaft ends, which are usually required for the bearing arrangement, are no longer necessary.

In one embodiment of the drive system, the planetary gear is arranged between an electric machine and a joint shaft, which is connected to a vehicle wheel and which transmits the torque generated by the electric machine to the vehicle wheel.

An advantage of the drive system according to the invention is that the number of the points in which friction is created in the radial bearings of the rotor of the electric machines is reduced. This therefore reduces the total friction occurring in the drive system and the losses connected with it. The electric range that can be reached is thus increased, or the electric consumption can be reduced.

Another advantage of the drive system according to the invention is that fewer components are used. Depending on the embodiment, compared to drive systems in which the rotors of the electric machines are mounted in a conventional manner, two or three bearings are saved, which reduces the weight, the required space or installation space and the costs of the drive system.

It goes without saying that the features mentioned above and those yet to be explained below can be used not only in the respectively indicated combination, but also in other combinations or separately without departing from the scope of the present invention.

BRIEF DESCRIPTION OF THE FIGURES

The invention will now be explained in more detail in the following based on an embodiment thereof with reference to the FIGURE:

FIG. 1 shows an embodiment of a drive system according to the invention.

DETAILED DESCRIPTION OF THE FIGURES

The drive system comprises a first electric machine 1 provided with a stator 11 and a with a rotor 12 mounted on a shaft 13, and a second electric machine 2 provided with a stator 21 and a rotor 22 mounted on a shaft 23.

The shafts 13 and 23 are arranged so as to be in alignment with each other. The end of the shaft 23 facing the first electric machine 1 is hollow and it overlaps coaxially the end of the shaft 13 facing the second electric machine 2.

An inner bearing 3, in which the shaft 13 is mounted, is arranged radially between the coaxially overlapping ends of the shafts 13 and 23, in the embodiment illustrated in the FIGURE, the bearing is a roller bearing. In other embodiment forms, the bearing is a sliding bearing. The hollow end of the shaft 23 is mounted in a roller bearing 4. The bearings 3 and 4 form a radially nested bearing assembly for the coaxially overlapping ends of the shafts 13 and 23.

When the shafts 13 and 23 of both electric machines 1 and 2 are rotated at the same rotational speed, a relative movement as well as friction will occur only in the radially outer bearing 4. Only with different rotational speeds of the shafts 13 and 23 of both electric machines 1 and 2, a relative movement and thus also friction will occur in the radially inner bearing 3. It is therefore advantageous when the bearing 3 is realized as a sliding bearing, which needs less space than a roller bearing.

The end of the shaft 13 facing away from the second electric machine 2 is mounted radially in a first planetary gear 5. In the embodiment that is shown in FIG. 1, the end of the shaft 13 is fixed in the sun wheel of the planetary gear 5.

The end of the shaft 23 facing away from the first electric machine 1 is mounted radially in a second planetary gear 6. In the embodiment that is shown in FIG. 1, the end of the shaft 23 is fixed in a sun wheel of the planetary gear 6.

In another embodiment, the respective ends of the rotor shafts 13 and 23 are fixed in the planetary carriers of the planetary gear 5 or 6. With the fixing in a planetary gear, the roller bearings that are usually required for mounting the corresponding shaft ends are no longer necessary. This makes it possible to dispense with two roller bearings when compared to a drive system provided with a conventional bearing construction of the rotor shafts 13 and 23.

The first planetary gear 5 connects the shaft 13 to a first joint shaft 7, which is connected to a first wheel (not shown) of the motor vehicle. In an analogous manner, the second planetary gear 6 connects the shaft 23 to a second joint shaft 8, which is connected to a second wheel (not shown) of the motor vehicle. The electric machines 1 and 2 drive two wheels of the motor vehicle which are arranged on a common axle.

The invention claimed is:

1. A drive system for a motor vehicle, comprising:
two electric machines and a rotor provided with a rotor shaft, wherein the two electric machines are configured to apply a torque to a shaft or to a wheel of the motor vehicle, wherein the rotor shafts of both electric machines are arranged so as to be in alignment and so that the ends located between the two rotor shafts of both electric machines coaxially overlap and a bearing is arranged radially between the two ends of the rotor shafts.

2. The drive system according to claim 1, wherein at least one end of the rotor shaft is formed hollow and has an inner diameter which is greater than the outer diameter of the corresponding end of the other rotor shaft and accepts the hollow end of one rotor shaft of the end of the other rotor shaft.

3. The drive system according to claim 2, wherein the outer diameter of the rotor shaft is increased towards the hollow end.

4. The drive system according to claim 3, wherein the outer diameter of the other rotor shaft is constant over the length thereof.

5. The drive system according to claim 2, wherein the outer diameter of the other rotor shaft is decreased towards the end, which is received by the hollow end of the rotor shaft having at least one hollow end.

6. The drive system according to claim 5, wherein the outer diameter of the rotor shaft is constant with at least one hollow end over the length thereof.

7. The drive system according to claim 2, wherein the outer diameter of the rotor shaft is increased with at least one hollow end towards the hollow end, and the outer diameter of the other rotor shaft is decreased toward the end which is received by the hollow end of the rotor shaft with at least one hollow end.

8. The drive system according to claim 1, wherein the bearing between the two coaxially overlapping ends of the rotor shafts is a roller bearing.

9. The drive system according to claim 1, wherein the bearing between the two coaxially overlapping ends of the rotor shafts is a sliding bearing.

10. The drive system according to claim 1, wherein the radially outer end of the two coaxially overlapping ends of the rotor shafts is mounted in a roller bearing.

11. The drive system according to claim 1, wherein the respective opposite ends of the rotor shafts of the two electric machines are radially fixed in a planetary gear.

12. The drive system according to claim 11, wherein the respective ends of the rotor shafts are radially fixed in the sun wheel of the planetary gear.

13. The drive system according to claim 11, wherein the respective end of the rotor shaft is radially fixed in the planetary carrier of the planetary gear.

14. The drive system according to claim 11, wherein the planetary gear is arranged between an electric machine and a joint shaft, which is connected to a wheel of the motor vehicle.

* * * * *